F. X. Kaffer,
Harness Hames.
N° 53,830. Patented Apr. 10, 1866.
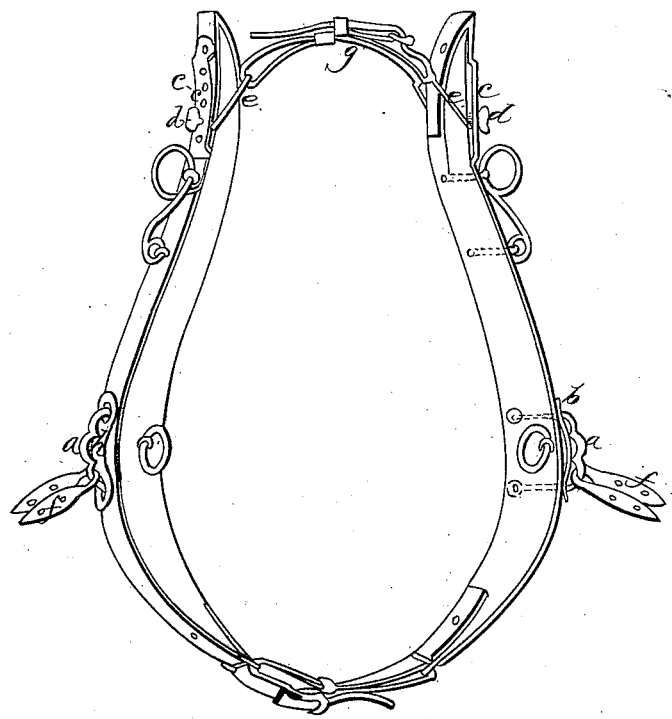
Witnesses:
G. Ely
G. W. Tayby
Inventor:
F. X. Kaffer

UNITED STATES PATENT OFFICE.

FRANCIS X. KAFFER, OF CHAMPAIGN CITY, ILLINOIS.

IMPROVED HAME.

Specification forming part of Letters Patent No. 53,830, dated April 10, 1866.

*To all whom it may concern:*

Be it known that I, FRANCIS X. KAFFER, of Champaign city, in Champaign county, in the State of Illinois, have invented a new and Improved Hame; and I do hereby declare that the following is a full and exact description thereof, reference being had to the accompanying drawing, and to the letters of reference marked thereon.

The nature of my invention consists of an apparatus for changing the draft-line of the ordinary hame by elevating or lowering the tug to accommodate the build or make of any particular animal upon which the same may be used, so as to make the draft as easy as possible to the animal.

To enable others skilled in the art to make and use my invention, I will proceed to describe its construction and operation.

I construct my hame in any of the ordinary forms; but, in order to regulate the draft and confine the same to the most desirable position for the animal, I make a notched staple, (marked $a$ in the drawing referred to,) to which the clip $f$ is attached, as in the ordinary manner, and may be moved up or down into any of said notches, as may be necessary, and which said clip is held out into the notch into which it may be placed by the flat spring $b$, which is fastened to the hame by the staple $a$, passing through both ends thereof into the hame, as in the ordinary manner.

What I claim as my invention, and desire to secure by Letters Patent, is—

The combination of the notched staple $a$ with the flat spring $b$, substantially as and for the purposes described.

F. X. KAFFER.

Witnesses:
 G. ELY,
 G. H. TAYLOR.